US008784664B2

(12) United States Patent
Fislage et al.

(10) Patent No.: US 8,784,664 B2
(45) Date of Patent: Jul. 22, 2014

(54) HOLLOW FIBRE MEMBRANE

(75) Inventors: Rainer Fislage, St. Wendel (DE); Igor Raiko, St. Wendel (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 667 days.

(21) Appl. No.: 12/811,241

(22) PCT Filed: Dec. 30, 2008

(86) PCT No.: PCT/EP2008/011149
§ 371 (c)(1),
(2), (4) Date: Oct. 15, 2010

(87) PCT Pub. No.: WO2009/083260
PCT Pub. Date: Jul. 9, 2009

(65) Prior Publication Data
US 2011/0114559 A1   May 19, 2011

(30) Foreign Application Priority Data
Jan. 3, 2008   (DE) .......................... 10 2008 003 090

(51) Int. Cl.
*B01D 11/00* (2006.01)
*B01D 39/00* (2006.01)
*B01D 29/46* (2006.01)
*B29C 47/00* (2006.01)
*B29C 47/88* (2006.01)
*B01D 71/10* (2006.01)
*B01D 63/00* (2006.01)

(52) U.S. Cl.
USPC ................. 210/645; 210/500.29; 210/500.23; 210/490; 210/321.8; 264/178 R

(58) Field of Classification Search
CPC .... B01D 63/02; B01D 69/087; B01D 69/088; B01D 69/12; B01D 71/10
USPC ............... 210/651, 500.23, 648, 483, 321.72, 210/644, 500.41, 500.27, 500.29–500.32, 210/500.71, 645, 490, 321.8; 264/178.28, 264/178 R; 604/28, 29
See application file for complete search history.

(56) References Cited

U.S. PATENT DOCUMENTS

| 4,276,173 | A | * | 6/1981 | Kell et al. ................ 210/500.23 |
| 4,978,451 | A |   | 12/1990 | Taylor |
| 5,063,009 | A | * | 11/1991 | Mizutani et al. ................ 264/49 |
| 5,085,676 | A | * | 2/1992 | Ekiner et al. ....................... 96/13 |

(Continued)

FOREIGN PATENT DOCUMENTS

EP       0 682 977 A2    11/1995
JP       62-19205     *   1/1987

OTHER PUBLICATIONS

Office Action for corresponding Chinese Patent Application No. 200880118554.4, dated Nov. 5, 2012.
English Translation of Office Action in corresponding Chinese Patent Application No. 200880118554.4, dated Nov. 5, 2012.

(Continued)

*Primary Examiner* — Ana Fortuna
(74) *Attorney, Agent, or Firm* — Millen, White, Zelano & Branigan, P.C.

(57) ABSTRACT

The present invention relates to a composite hollow fiber capillary membrane in particular for exploiting the value of dialysate and a method for the production thereof as well as its use in particular in haemo and peritoneal dialysis.

26 Claims, 1 Drawing Sheet

(56) References Cited

U.S. PATENT DOCUMENTS

Figure 1:
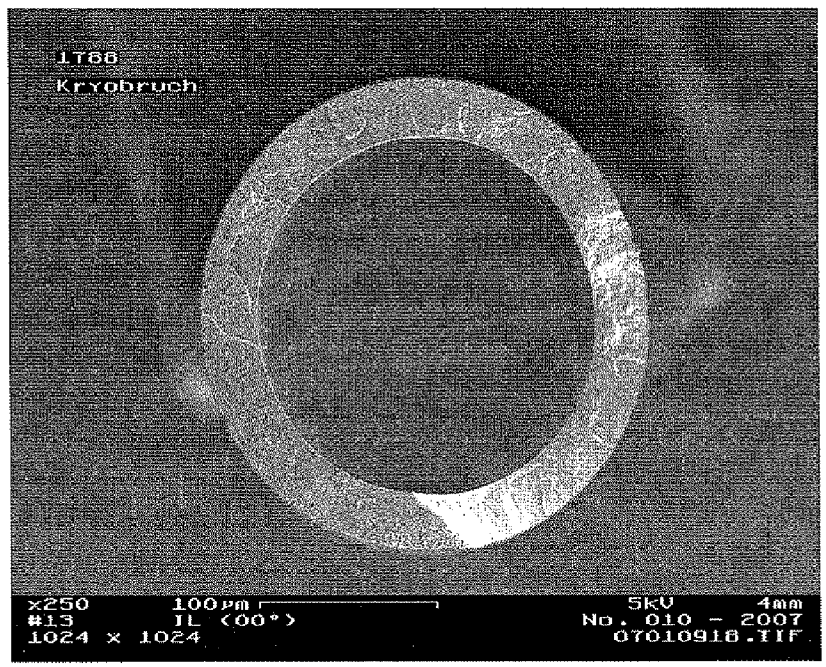

| | | | |
|---|---|---|---|
| 5,505,890 A * | 4/1996 | Duweg et al. | 264/177.14 |
| 5,599,380 A | 2/1997 | Koros | |
| 6,013,182 A * | 1/2000 | Emi et al. | 210/500.23 |
| 2006/0234582 A1 | 10/2006 | Gohl et al. | |
| 2010/0114012 A1* | 5/2010 | Sandford et al. | 604/28 |
| 2011/0060273 A1* | 3/2011 | Ofsthun et al. | 604/29 |
| 2012/0210869 A1* | 8/2012 | Finkler et al. | 95/45 |

OTHER PUBLICATIONS

Yanagimoto Takeshi, "Preparation of Ultrafilter Membrane," English Abstracts of Japanese Patent Publication No. 62-019205; Publication Date: Jan. 28, 1987; Application No. 60-156017; Filing Date: Jul. 17, 1985; Applicant: NOK Corp. (Patent Abstracts of Japan).

International Search Report of PCT/EP2008/011149 (Mar. 18, 2009).

* cited by examiner

HOLLOW FIBRE MEMBRANE

The present invention relates to a hollow fibre capillary membrane and a method for the production thereof as well as its use in particular in haemo- and peritoneal dialysis for exploiting the value of the dialysate.

Capillary membranes of different compositions are known in particular because of their increasing use in dialysis. The use and production of membranes, in particular capillary membranes, in dialysis is described for example in the publication by Samtleben and Lysaght in: Hörl et al. Replacement of Renal Function by Dialysis 5th ed., Kluwer, 2004, pp. 709 to 724.

Techniques for producing hollow fibre membranes are disclosed for example in M. Mulder, Basic Principles of Membrane Technology, second ed., Kluwer 1996, pp. 71-91. Typical methods include the so-called phase inversion process (see below), melt spinning method or the "dry-wet spinning method" (see e.g. Hao et al. J. Appl. Polym. Science 62, 129-133 (1996)).

So-called hollow fibre spinnerets are often used for producing capillary membranes, in particular by means of the phase inversion process. When producing a hollow fibre membrane by means of a hollow fibre spinneret, the hollow fibre membrane is produced in a so-called precipitation spinning process, wherein the polymers to be precipitated emerge from an annular slit of a spinneret arrangement, while the corresponding precipitant flows out of a central precipitant bore. A hollow fibre spinneret of the named type is disclosed for example in DE 10211051 A1.

Composite hollow fibre membranes built up from several layers of different functions are already known from the state of the art:

WO 00/78437 discloses a supported hollow fibre membrane in which the support layer consists of braided polymer fibres which give the whole fibre an increased life and resistance to friction and tension while being used in microfiltration or ultrafiltration. A polymer film in which particles of calcined alpha aluminium oxide are dispersed is applied to this support structure.

US 2007/0213665 discloses a wearable kidney comprising a cartridge for regenerating the dialysate during kidney dialysis. In the cartridge there is arranged a membrane which consists of a polysulfone layer onto which a cellulose acetate, not described in more detail, is coated.

EP 418 432 A1 discloses a supported hydrophilic composite membrane in which cuproammonium-regenerated cellulose is deposited on a support layer of for example polypropylene, polyvinylidene fluoride etc. Cuproammonium-regenerated cellulose is non-chemically derivatized cellulose in its natural state. The hollow fibre membrane is coated, not on its inner surface, but on its outer surface.

U.S. Pat. No. 4,276,172 discloses an uncoated cellulosic membrane for blood dialysis using cuproammonium cellulose, containing at least one layer containing dialkylamino cellulose. Problems arise here in relation to the strength of the bond between the layers. The pores of the membrane described there are so large that it is non-specific vis-à-vis low-molecular-weight organic compounds or cations with urea. The internal wall thickness of the internal layer of such a membrane is 10-50% of the overall wall thickness of the hollow fibre membrane.

EP 286 091 B1 discloses a polysulfone hollow fibre membrane which is coated with a solution of ethyl cellulose for use in fluid separation in industrial processes.

EP 359 834 B1 likewise describes multi-layered hollow fibre membranes of polysulfone and cellulose acetate layers, wherein cellulose acetate is applied by precipitation from solution onto the ready-prepared (preformed) polysulfone hollow fibres for use in industrial processes.

U.S. Pat. No. 5,156,740 further discloses a composite membrane consisting of a non-porous separation layer of crosslinked polyvinyl alcohol as well as of a support layer of polysulfone for use in pervaporation processes.

In medical processes such as peritoneal and haemodialysis, the dialysate loaded with uremic toxins can be regenerated for example using adsorber materials in order to minimize consumption of high-purity dialysate solutions, e.g. to provide wearable dialysis systems. It is likewise normal for the dialysate to be discarded.

Most of the quantity of approx. 20 to 30 g urea which occurs daily in human metabolism is consumed by the adsorber materials used. Typically either cation exchangers are used in aqueous phase or—as described above in the state of the art—hollow fibre capillary membranes with selective urea permeability, which is particularly advantageous in portable dialysis systems when exploiting the value of dialysate (US 2007/0213665 A1). However, with the above-named systems, an unsatisfactory urea selectivity vis-à-vis mono- and divalent cations leads to competing reactions on the adsorber material arranged following the membrane. This reduces the adsorber capacity and conversely requires a large quantity of adsorber material, necessitating a higher weight of the adsorber material, which, though undesirable, is necessary.

The previously known composite membranes produced by coating also have the disadvantage that their production, i.e. in particular their structure, could be achieved only by complicated and expensive process steps.

Further, with the hollow fibre membranes known from the state of the art, such thin layer thicknesses of the selective layer, in particular of the layer selective for urea, cannot be achieved. Thus limits were set to their selectivity, i.e. maximizing the separation of the desired substances and minimizing the undesired compounds which pass through the selective layer. In particular with the composite hollow fibre membranes known thus far for separating urea, the diffusion paths of the urea were too long, with the result that the separation was incomplete and protracted.

Therefore, the object was to make available a multilayer (composite) hollow fibre capillary membrane which is advantageous in particular in the selective separation of urea for charged compounds, such as e.g. cations from solutions. In particular the membrane should have a selective separation of urea vis-à-vis mono- or divalent metal cations, i.e. alkali and alkaline-earth cations essential in particular for the human organism. This membrane should in particular also have small layer thicknesses of the selection layer in order to minimize the diffusion paths of the substance to be separated off and thus increase the efficiency of the separation of the substance, in particular e.g. urea.

The object of the present invention is achieved by a supported composite hollow fibre membrane comprising a coextrudate comprising a support layer and a selection layer. The selection layer is arranged either lumen-side or on the outer surface.

The term "coextrudate" means that support layer and selection layer have been produced simultaneously by a coextrusion process known per se to a person skilled in the art and both layers form together a solid bond (composite).

The coextrudate comprising the support layer and the selection layer allows the simultaneous production of the support and selection layer in a single process step and leads to a mechanically solid bond between support layer and selection layer.

The term "selection layer" means that this layer is selectively permeable for at least one selected substance from a (liquid) mixture of substances and is impermeable for other substances of the mixture of substances.

Moreover the use of a coextrudate makes possible the formation of extremely thin layers of under 800 nm. The efficiency of the separation is thereby increased. The thin layers according to the present invention mean that the diffusion paths of the compounds to be separated can be minimized. The wall thickness of the selection layer is preferably 2-5% of the overall wall strength of the hollow fibre membrane.

In preferred embodiments of the invention the selection layer is urea-selective, i.e. permeable only for urea, in particular vis-à-vis alkali and alkaline-earth metal cations such as $Na^+$, $K^+$, $Ca^{2+}$, $Mg^{2+}$, etc. which cannot pass through this layer, with the result that the hollow fibre membrane according to the invention can particularly preferably be used in haemo- and peritoneal dialysis for dialysate regeneration. It is understood that very small quantities, below or at the detection limit, of these cations can also diffuse through.

As smaller quantities of adsorber are required by a high urea membrane selectivity, substantial weight advantages are also achieved in wearable dialysis devices when using the membrane according to the invention, for example in microfiltration systems.

The thickness of the—in particular urea-selective—selection layer is, according to the invention, in the range of from 100 nm to 5 μm, preferably in the range of from 200 to 800 nm, in particular of from 300 to 600 nm, the layer thickness is quite particularly preferably approx. 500 nm, with the result that the diffusion paths, i.e. of urea or other uncharged compounds, can be minimized, as the transport rate of the urea is thereby optimized.

The wall thickness of the selection layer is based on two opposing conditions. A high selectivity is caused by a greater thickness of the selective layer. However, the diffusion path also lengthens simultaneously with the thickness of the selective layer, with the result that the separation process is slowed down and becomes less effective. According to the invention the optimum layer thickness therefore lies in the above-named range, with the result that neither selectivity nor diffusion are too strongly limited.

In quite particularly preferred developments of the invention the selection layer consists of an esterified cellulose, quite particularly preferably of an acetyl cellulose. Typically, cellulose esters which are produced industrially by reacting cellulose with acetic anhydride in acetic acid or methylene chloride using strong acids in discontinuous processes are described as acetyl cellulose. Completely acetylated products (triacetates containing respectively 44.8 and 62.5% acetyl groups and bonded acetic acid) fastly occur as typical results. Esters with other acyl radicals, such as e.g. propionyl or butyryl esters, can also be used. Likewise, in preferred embodiments mixed esters can be used with different acyl radicals, such as acetyl, propionyl, butyryl, longer-chain or branched acyl radicals. By way of example acetyl-butyryl cellulose esters or propionyl butyryl cellulose esters may be mentioned.

Simultaneously with the acetylation an acid-catalyzed depolymerization of the cellulose backbone takes place, with the result that the typically used cellulose only has degrees of polymerization of from approx. 100 to 350.

Preferred acetyl celluloses or mixed esterified celluloses within the framework of the present invention have degrees of acylation or esterification of from 0.5 to 3, quite preferably of from 2 to 3. A degree of acylation of 3 corresponds e.g. to cellulose triacetate, a degree of acylation of 2 corresponds e.g. to cellulose diacetate. The average degree of acylation indicates how many acyl radicals per repetition unit are bonded on average to the free OH groups of the cellulose. High degrees of acylation or degrees of esterification up to the theoretically maximum possible degree of acylation of 3 are preferred, as it was found that the selectivity of the in particular urea-selective layer increases with the degree of acylation or esterification. It was found that higher degrees of substitution up to e.g. cellulose triacetate further increase the selectivity of the acyl cellulose layer for urea. The same is also true of the corresponding above-named mixed esters.

The selection layer, preferably the acetyl cellulose layer or mixed ester cellulose layer, typically has an urea permeability in the range of from 10 to 80 g per day per $m^2$, quite particularly preferably between 11 to 60 g per day per $m^2$. Sodium permeabilities, i.e. permeabilities for monovalently charged cations, have permeabilities between 0 and 112 mmol per day per $m^2$. The selection layer used according to the invention is impermeable for bivalent cations, such as e.g. $Ca^{2+}$, $Mg^{2+}$ etc. within the framework of customary measurement accuracy. The selection layer is typically a dense, pore-free layer. By pore-free is meant in this context that the selection layer has an exclusion boundary vis-à-vis high-molecular-weight substances because of its volume. Preferably, this exclusion limit is already effective at the smallest possible volume, with the result that only monomolecular substances are capable of penetrating the selection layer because of their size.

It was found here that the sodium chloride permeability or generally the permeability for monovalent cations changes with the change in the degree of acylation or degree of esterification. For example, as the degree of esterification increases, an improvement in sodium retention is also observed.

The extremely thin layers of the selection layer present according to the invention are mechanically unstable, with the result that a support layer is required. This and its presence as coextrudate lead to an increased mechanical strength of the composite hollow fibre membrane according to the invention compared with the known composite membranes of the state of the art.

The material of the support layer is preferably selected from polyvinylpyrrolidone (PVP), polyethersulfone (PES), polyetherimide (PEI), polyamide (PA), polycarbonate (PC), polystyrene (PS), polymethyl methacrylate (PMMA), polyvinylidene fluoride (PVDF), polyacrylonitrile (PAN), polyimide (PI), polysulfone (PSU) and/or polyurethane (PU) and mixtures thereof. By way of example, in preferred embodiments of the invention, PVP is often contained in the support layer as a hydrophilizing constituent.

When selecting the material of the support layer it is important that there is a sufficiently high permeability and hydrophily of the support layer, with the result that along the comparably long transport path through the support layer no, or only a small, diffusion resistance is triggered by the compound passing through, e.g. urea.

The preferred material of the support layer is, according to the invention, polysulfone, polyvinylpyrrolidone and mixtures thereof, as the conditions for producing for example polysulfone membranes are sufficiently well examined and different levels of permeabilities can be set selectively through known process parameters. Polysulfone is therefore quite particularly preferred, optionally with added PVP, which because of its good thermodynamic compatibility can be cast for example with polyurethane to form fibre bundles (module) for microfiltration systems.

The thickness of the support layer lies typically in the range of from 20 to 50 µm, preferably in the range of from 30 to 40 µm which, as already stated above, can be particularly well reached with polysulfone.

Typical values for the internal diameter of the hollow fibre capillary membrane according to the invention are from 20 µm to 1 mm and the overall wall thickness of the hollow fibre capillary membrane 20 to 100 µm.

The object of the present invention is also achieved by a method for producing a hollow fibre membrane according to the invention, comprising the steps of
  a) providing two spinning mass solutions A and B, wherein the spinning mass solution A is a solution of an esterified cellulose and the spinning mass solution B a solution containing a polymer selected from the group consisting of polyvinylpyrrolidone (PVP), polyethersulfone (PES), polyetherimide (PEI), polyamide (PA), polycarbonate (PC), polystyrene (PS), polymethyl methacrylate (PMMA), polyvinylidene fluoride (PVDF), polyacrylonitrile (PAN), polyimide (PI), polysulfone (PSU) and/or polyurethane (PU) and mixtures thereof;
  b) setting the precipitation bath temperature at 40 to 95° C.;
  c) bringing the spinning mass solutions A and B into contact with an internal precipitant via a hollow fibre spinneret; and
  d) coagulating and precipitating the extrudate consisting of the substances dissolved in the spinning mass solutions A and B.

By using the spinning process according to the invention, in particular the thickness of the coextrudate or of the two layers forming the coextrudate can be set selectively, with the result that a high urea permeability for the selection layer and further a good retention for mono- or divalent cations is achieved and simultaneously the support layer can be formed so thin that no, or only a small, diffusion resistance builds up because of the urea passing through during filtration.

This can be particularly well achieved by the previously named phase inversion process of the spinning method. As already said, the material of the support layer consists of polysulfone, polyvinylpyrrolidone or mixtures thereof. Quite particularly preferably the material of the support layer consists of polysulfone.

In preferred embodiments of the method the viscosity of the spinning mass solution A which contains cellulose acetate is 10,000 to approx. 17,000 mPas (determined by means of a Haake rotational micrometer (VTSSO) and the measuring-cup system (MV-ST)). The viscosity is typically maintained by a content of from 25 to 40 wt.-% cellulose acetate in for example dimethyl acetamide.

The viscosity of the spinning mass solution B which contains the polymer for the support layer lies typically in the range of from 7,000 to 13,000 mPas.

Water with a spinning speed of from 200 to 400 mm/s is preferably used as internal precipitant in the method according to the invention.

The term "internal precipitant" denotes the lumen-side precipitant. According to the invention water is used and water is also used as precipitant in the precipitation bath itself. Water acts as so-called "hard" precipitant, which leads to the membrane having on the inside an increased impermeability vis-à-vis mono- or divalent cations such as e.g. sodium, potassium, magnesium or calcium. By using an air gap between block and water surface as well as a very slow water transport through the e.g. cellulose acetate inner layer, a so-called "softer" precipitation takes place in the outer layer, with the result that pores are formed on the outside. Precipitation typically involves through-precipitation with water from outside to inside, wherein a pore gradient is obtained from inside (typically no pores) to outside (large pores).

Without air gap and precipitation for example in a solvent-containing precipitation bath, a hollow fibre would be obtained which was precipitated from inside and outside simultaneously, with the result that the largest pores would form in the centre of the fibre, which is undesirable for the present purpose of the hollow fibre membrane according to the invention.

The spinning block temperature is set preferably to a temperature of from 5 to 90° C. and the precipitation bath temperature to a range of from 40 to 95° C., preferably approx. 40° C., as a coextrudate is thus obtained which has a selection layer which has an increased retention capability for mono- or divalent cations and still has an extremely high urea permeability. Preferred block temperatures lie in the range of from 5 to 40° C.

The present invention also relates to a hollow fibre membrane which can be obtained by a method according to the invention as well as a membrane filter which comprises a plurality of hollow fibre membranes according to the invention, such as described quite generally for example in DE 10 2004 020 226 A1.

Particularly preferably membrane filters according to the invention are used in dialysis procedures, e.g. in haemo- and peritoneal dialysis in particular for regenerating dialysate.

Surprisingly it was found that the membrane according to the invention also has a good permeability for sugar molecules, e.g. glucose. Thus the membrane according to the invention can be used preferably in the separation of glucose from reaction mixtures, e.g. in bioethanol production.

Figure 2:
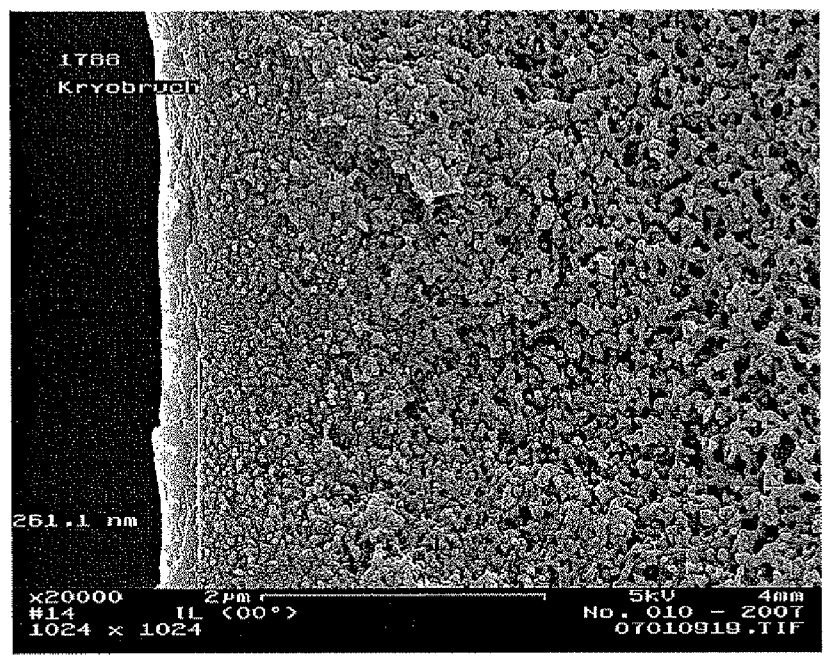

The invention is explained in more detail using the following Figures and Examples There are shown in FIG. 1: a REM photograph of a cryofracture through a two-layer composite fibre according to the invention consisting of a coextrudate;

FIG. 2: an enlargement of the REM photograph of the cryofracture from FIG. 1.

EMBODIMENT EXAMPLES

Example 1

A hollow fibre according to the invention is produced according to the so-called phase inversion process. Firstly, two spinning mass solutions A and B are produced. The first spinning mass solution A contains the material for the lumen-side selection layer of the hollow fibre membrane and the second spinning mass solution B the material for the support layer.

The spinning mass solution for the support layer (the outer layer) consists of 20 wt.-% Udel 3500 polysulfone and 5 wt.-% polyvinylpyrrolidone K90 as well as 1 wt.-% water which are dissolved in dimethyl acetamide. The viscosity of this solution was approx. 11,500 meas.

The spinning mass for the lumen-side selection layer consisted of 30 wt.-% cellulose diacetate with a molecular weight of 29 kD and an acetyl content of 40% (obtainable from Sigma/Aldrich). This was dissolved accompanied by stirring in dimethyl acetamide. The viscosity of this solution was approx. 15,000 mPas.

Both spinning mass solutions were spun in a suitable volume ratio by a composite hollow fibre spinneret such as is known from the state of the art. Both solutions were guided through die channels which are concentric to one another, which permit the coextrusion of the inner and outer spinning masses. The two concentric die channels surround an axial channel through which a precipitant is guided which serves to coagulate the two spinning mass layers. Water was used as internal precipitant.

The temperature of the die block (spinning block) was 20° C., but can be varied further within the framework of the method according to the invention.

It was surprisingly found that fibres spun at low temperature (<30° C.) have a higher urea selectivity vis-à-vis cations such as sodium, potassium, i.e. monovalent cations.

After leaving the spinning block, the hollow fibre passed through an air gap of approx. 250 mm before dipping into a water-filled precipitation bath at a temperature of approx. 42° C. Then the thus-obtained composite hollow fibre was rinsed in a rinsing bath which was temperature-controlled at 75° C. The rate of feed of the fibre was 250 mm/s.

The thus-obtained hollow fibre was then dried at approx. 95° C.

The volumes of precipitation bath and rinsing bath and the rate of feed were set such that a solvent-free regular hollow fibre was obtained.

The dried fibre was then wound. A bundle of the hollow fibre consists of 2300 fibres with a total surface area of 0.4 m². The internal fibre diameter was 200 μm. The external fibre diameter was 261 μm.

The thickness of the selection layer was approx. 500 nm.

The fibres were moulded into a housing and cast with polyurethane into a module such that an independent inflow of fibre lumen and fibre exterior was ensured.

Such modules are typically known to a person skilled in the art from haemodialysis.

FIG. 1 shows an REM image magnified 250 times and FIG. 2 a section magnified 20,000 times obtained from FIG. 1.

By "cryofracture" is meant that the hollow fibre membrane according to the invention is immersed in liquid nitrogen and then broken manually in transverse direction.

The porous structure of the polysulfone support layer shown on the right can be clearly seen from FIG. 2 as well as the virtually pore-free structure of the thin cellulose diacetate selection layer shown on the left.

Example 2

Measuring the Essential Physical Parameters of a Membrane According to the Invention The ultrafiltration rate of the hollow fibre membrane obtained in Example 1 was then examined as well as its permeability for urea and various salts.

To determine the aqueous ultrafiltration, an excess pressure was applied lumen side at a temperature of 37° C. and the quantity of water which overflowed from the lumen side of the hollow fibre onto the outside of the hollow fibre was measured.

The measured ultrafiltration rates of the membrane according to the invention from Example 1 lay in the range of from 0.1 to 0.3 [ml/h torr m²].

To determine the urea and salt permeability, 500-700 ml of a urea-containing salt solution was used which contained 25 mM urea, 141 mM NaCl, 2.5 mM $CaCl_2$, 249 mM glucose and which was recirculated lumen side through the hollow fibre at 50 ml/min.

The solution on the lumen side of the hollow fibre was located in a pressure-sealed vessel, with the result that the volume of the test solution could not change over the duration of the experiment.

On the outside of the membrane a 538 mM glucose solution was pumped in contraflow with a flow rate of 50 ml/min.

After two hours at room temperature a sample was removed from the solution circulating lumen side and examined with a commercial analysis device (Cobas Integra 400, Roche).

The permeability and selectivity of the membrane can be calculated from the concentrations of the examined starting solution.

The following results were obtained with the membrane from Example 1, during the separation of the above-named urea-containing solution:

TABLE 1

| Permeability and selectivity of the membrane according to the invention according to Example 1 | | | |
|---|---|---|---|
|  | Sodium | Urea | Calcium |
| Starting value [mM] | 158 | 25 | 2.8 |
| Value after 2 h [mM] | 157 | 15 | 3.0 |

The variation coefficient of the measurement was 1% for sodium, 3.5% for calcium and 1.8% for urea.

As can be seen from the measurements, urea is well separated by the hollow fibre membrane according to the invention, while sodium and calcium are largely retained.

Example 3

To further characterize the membrane, permeation tests were carried out with pure gases. For this, the hollow fibre was subjected lumen side to an excess pressure of approx. 1 bar of the gas and the resulting gas flow over the membrane measured. The following table shows a typical result.

TABLE 2

| Gas flow through the membrane according to the invention at room temperature and a pressure gradient over the membrane of 1 bar. | | |
|---|---|---|
|  | Nitrogen | Carbon dioxide |
| Gas flow [ml/h torr m²] | 0.1 | 15 |

These results show that the membrane according to the invention has only very few pores, as customary throughflows with customary membranes are typically several liters.

The invention claimed is:

1. A supported hollow fiber membrane comprising a coextrudate comprising a porous support layer and a dense selection layer,
    wherein the dense selection layer is impermeable to bivalent cations within the framework of customary measurement accuracy, consists of an esterified cellulose with an acylation degree in the range of from 0.5 to 3, and has a urea permeability in the range of from 10-80 g per day per m².

2. The hollow fiber membrane according to claim 1, wherein the esterified cellulose is an acetyl cellulose.

3. The hollow fiber membrane according to claim 1, wherein the selection layer is pore-free.

4. The hollow fiber membrane according to claim 1, wherein the material of the support layer is selected from polyvinylpyrrolidone (PVP), polyethersulfone (PES), polyetherimide (PEI), polyamide (PA), polycarbonate (PC), polystyrene (PS), polymethyl methacrylate (PMMA), polyvinylidene fluoride (PVDF), polyacrylonitrile (PAN), polyimide (PI), polysulfone (PSU), polyurethane (PU) and mixtures thereof.

5. The hollow fiber membrane according to claim 4, wherein the material of the support layer is selected from polysulfone (PSU), polyvinylpyrrolidone (PVP) and mixtures thereof.

6. The hollow fiber membrane according to claim 4, wherein the thickness of the support layer lies in the range of from 20 to 50 μm.

7. The hollow fiber membrane according to claim 6, wherein the internal diameter of the hollow fiber membrane has a value in the range of from 20 μm to 1 mm.

8. The hollow fiber membrane according to claim 7, wherein the overall wall thickness of the hollow fiber membrane has a value in the range of from 20 μm to 100 μm.

9. The hollow fiber membrane according to claim 4, wherein the thickness of the support layer lies in the range of from 30 to 40 μm.

10. A membrane filter comprising a plurality of hollow fiber membranes according to claim 1.

11. The hollow fiber membrane according to claim 1, wherein the thickness of the selection layer is in the range of from 200 to 800 nm.

12. The hollow fiber membrane according to claim 1, wherein the thickness of the selection layer is in the range of from 300 to 600 nm.

13. The hollow fiber membrane according to claim 1, wherein the thickness of the selection layer is 100 nm to 5 μm.

14. The hollow fiber membrane according to claim 1, wherein said selection layer has a urea permeability of between 11 to 60 g per day per m$^2$.

15. The hollow fiber membrane according to claim 1, wherein said selection layer has a sodium permeability of between 0 and 112 mmol per day per m$^2$.

16. A method for producing a supported hollow fiber membrane according to claim 1, said method comprising:
providing two spinning mass solutions A and B, wherein the spinning mass solution A is a solution of an esterified cellulose and the spinning mass solution B a solution containing a polymer selected from the group consisting of polyvinylpyrrolidone (PVP), polyethersulfone (PES), polyetherimide (PEI), polyamide (PA), polycarbonate (PC), polystyrene (PS), polymethyl methacrylate (PMMA), polyvinylidene fluoride (PVDF), polyacrylonitrile (PAN), polyimide (PI), polysulfone (PSU), polyurethane (PU), and mixtures thereof;
setting the precipitation bath temperature at 40 to 95° C.;
bringing the spinning mass solutions A and B into contact with water as an internal precipitant via a hollow fiber spinneret; and
coagulating and precipitating the extrudate consisting of the substances dissolved in the spinning mass solutions A and B.

17. A method of regenerating dialysate comprising passing dialysate through a supported hollow fiber membrane according to claim 1.

18. A method for producing a supported hollow fiber membrane comprising a coextrudate having a support layer and a selection layer impermeable to bivalent cations, said method comprising:
providing two spinning mass solutions A and B, wherein the spinning mass solution A is a solution of an esterified cellulose and the spinning mass solution B a solution containing a polymer selected from the group consisting of polyvinylpyrrolidone (PVP), polyethersulfone (PES), polyetherimide (PEI), polyamide (PA), polycarbonate (PC), polystyrene (PS), polymethyl methacrylate (PMMA), polyvinylidene fluoride (PVDF), polyacrylonitrile (PAN), polyimide (PI), polysulfone (PSU), polyurethane (PU), and mixtures thereof;
setting the precipitation bath temperature at 40 to 95° C.;
bringing the spinning mass solutions A and B into contact with water as an internal precipitant via a hollow fiber spinneret with a spinning speed of 200 to 400 mm/sec; and
coagulating and precipitating the extrudate consisting of the substances dissolved in the spinning mass solutions A and B.

19. The method according to claim 18, wherein the viscosity of spinning mass solution A lies in the range of from 10,000 to 17,000 mPa·s.

20. The method according to claim 19, wherein the spinning mass solution A contains 25 to 40 wt.-% cellulose diacetate in dimethyl acetamide.

21. The method according to claim 18, wherein the viscosity of spinning mass solution A lies in the range of from 7,000 to 13,000 mPa·s.

22. The method according to claim 21, wherein the spinning mass solution B contains 15 to 35% polysulfone, 4 to 8% polyvinylpyrrolidone as well as dimethyl acetamide.

23. The method according to claim 18, wherein water is used as precipitant.

24. The method according to claim 23, wherein the spinning speed is 200 to 400 mm/s.

25. The method according to claim 23, wherein the spinning block temperature is set at 5 to 90° C.

26. A hollow fiber membrane obtainable by a method according to claim 18.

* * * * *